July 14, 1959
J. M. BEYERSTEDT ET AL
2,894,419
ADZING BITS
Filed April 7, 1958
3 Sheets-Sheet 1
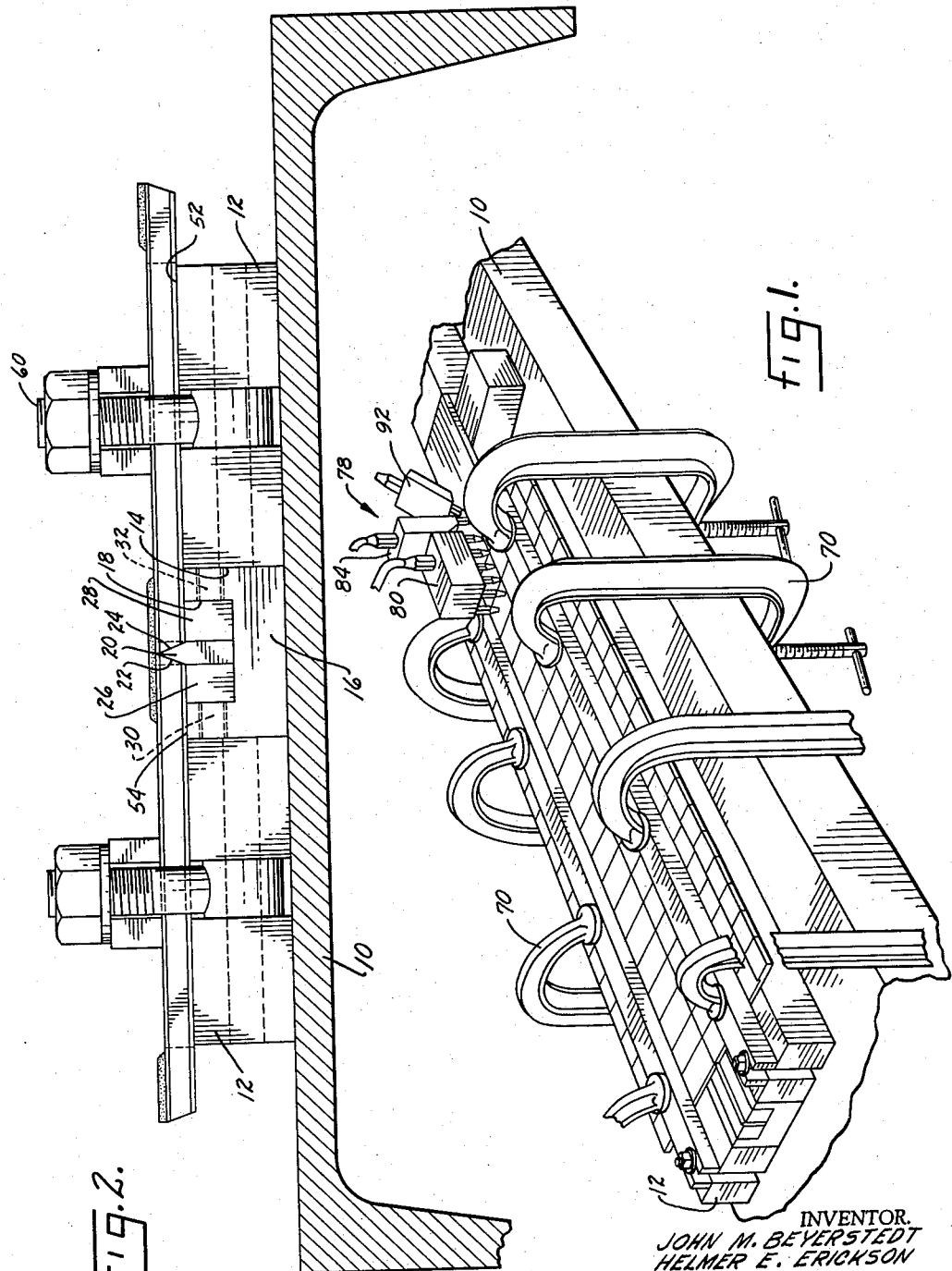
INVENTOR.
JOHN M. BEYERSTEDT
HELMER E. ERICKSON
BY
Parker and Carter
ATTORNEYS.

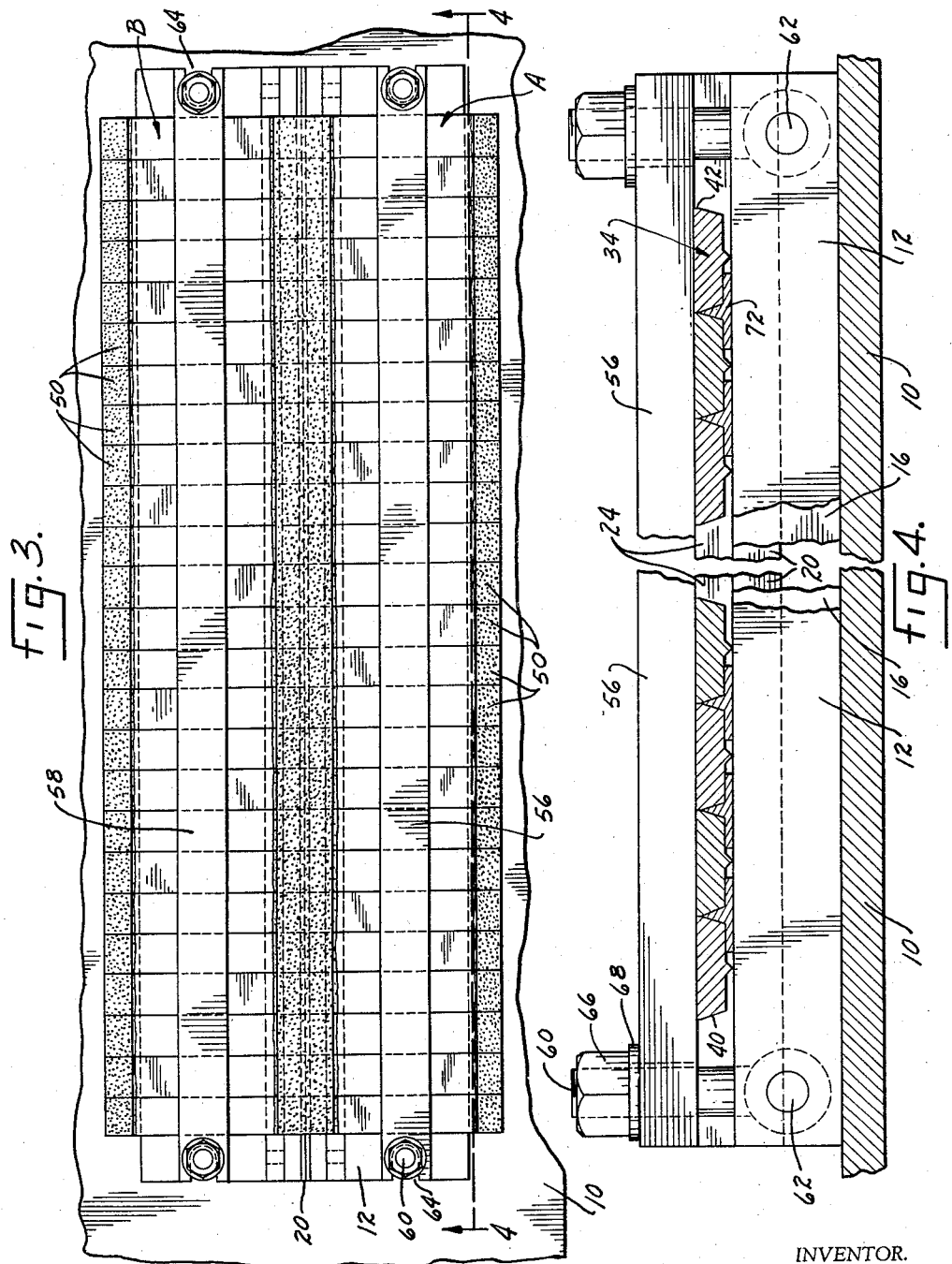

July 14, 1959 J. M. BEYERSTEDT ET AL 2,894,419
ADZING BITS
Filed April 7, 1958 3 Sheets-Sheet 3
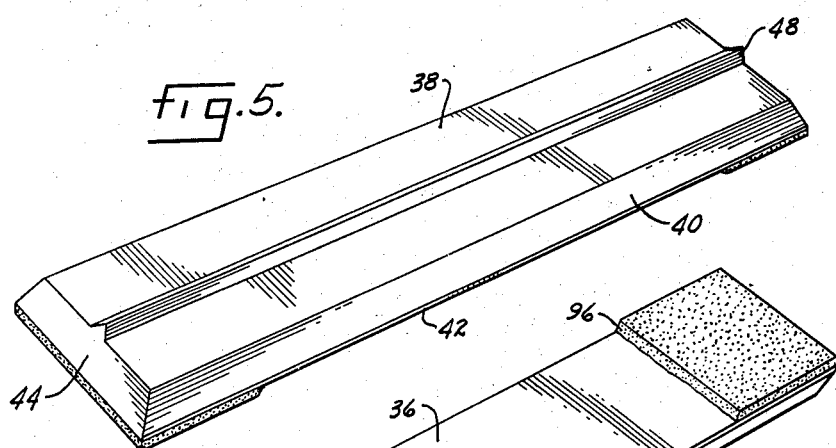
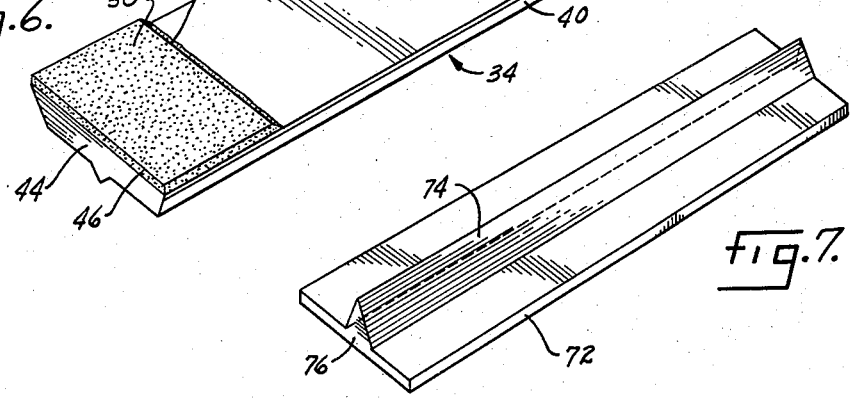
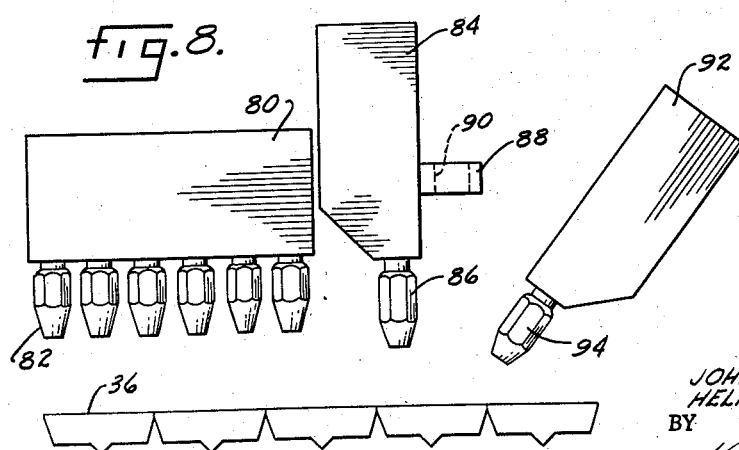
INVENTOR.
JOHN M. BEYERSTEDT
HELMER E. ERICKSON
BY
Parker and Carter
ATTORNEYS.

United States Patent Office 2,894,419
Patented July 14, 1959

2,894,419
ADZING BITS

John M. Beyerstedt, West Allis, and Helmer E. Erickson, Milwaukee, Wis., assignors to Nordberg Manufacturing Company, Milwaukee, Wis., a corporation of Wisconsin Application April 7, 1958, Serial No. 726,864

10 Claims. (Cl. 76—103)

This is a continuation-in-part of our copending application Serial No. 656,854, filed May 3, 1957, now abandoned, which was a division of application Serial No. 585,544, filed May 17, 1956, now U.S. Patent No. 2,796,898.

Our invention relates to an improvement in adzer bits and methods of making them.

A primary object of the invention is a method of making an improved bit having high impact resistance and also high resistance to wear or abrasion.

Another object is a method of making such a bit in which a body of metal with high impact resistance carries a cutting surface or area or part with high abrasive resistance.

Another object is a method of operating an improved mechanism or appliance useful in making such bits.

Another object is a method of making such a bit by the controlled application of heat.

Another object is a method of making adzer bits so that more ties may be adzed between sharpenings due to increased available adzing time.

Another object is a method of making adzer bits which will result in heavier cuts with less wear and faster adzing.

Another object is a method of making adzer bits which will adz more ties per dollar cost of the bits.

Another object is a method of making adzer bits having a better adzing cutting edge that will withstand shock.

Another object is a method of making adzer bits having a tough shock resisting base that is hard enough to withstand the beating of ballast.

Another object is a method of applying tungsten carbide to adzer bits by oxy-acetylene welding.

Another object is a method of applying a thin layer, for example 1/16 of an inch of a wear-resistant material to the cutting faces of a relatively thin body, for example 1/4 of an inch of alloy steel adzing bit without spoiling the characteristics of the bit.

Another object is a method of applying an abrasion resistant layer to the surface of an elongated adzing bit to obtain the full depth of deposit at the ends and sides.

Another object is a method of depositing a wear-resistant layer on a base metal which is only of the order of four times as thick as the layer.

Another object is a method of applying a wear-resistant layer including hardened particles, such as tungsten carbide and a matrix to an adzer bit to maintain uniform dispersion of the particles in the matrix.

Another object is a method of applying a wear-resistant layer or surface to adzer bits to obtain a uniform deposit of wear-resistant particles, for example tungsten carbide, both as to thickness and size without burning through the edges and sides of the bits.

Another object is a method of making an adzer bit of the above type by depositing the tungsten carbide with as little dilution of the base metal as possible.

Another object is a method of making an adzer bit which involves depositing the tungsten carbide with as low a heat as possible applied for as short a time as possible.

Another object is a method of the above type which results in a good bond between the matrix with the tungsten carbide particles and the base metal.

Another object is a method of the above type which avoids cracks in the matrix.

Another object is a method of the above type which provides a uniform heating of all bits.

Other objects will appear from time to time in the ensuing specification and drawings in which:

Figure 1 is a perspective of a structure useable for performing the method;

Figure 2 is an end view, on an enlarged scale, of a mechanism or fixture for carrying out the method;

Figure 3 is a plan view, on a reduced scale, of Figure 2;

Figure 4 is a side view, on an enlarged scale, of Figure 3;

Figure 5 is a perspective view of a finished bit;

Figure 6 is a perspective view of the other side of the bit;

Figure 7 is a perspective view of a spacer; and

Figure 8 is a schematic side view of a portion of the apparatus.

Like parts are indicated by like symbols throughout the specification and drawings.

Referring to the drawings, in Figures 1, 2 and 3 a suitable base is indicated at 10. Its upper surface may be provided with an elongated plate or divided support 12 having a central channel 14. The channel has an insert 16 which has a central channel 18. Extending upwardly in the channel 18 is a positioning blade, fin, or extension 20, possibly formed of copper or any other suitable high heat-transfer material, the blade or fin having upwardly convergent plane surfaces 22 and 24. The blade is held in place by suitable spacers 26 and 28 which may be engaged by suitable set screws 30 and 32 disposed at suitable intervals along the upstanding ribs on each side of the channel in the insert 16.

The finished bit is illustrated in Figures 5 and 6. It should be understood that, before treatment, the elongated bit body 34 has upper and lower surfaces 36 and 38 which are preferably parallel and connected by convergent longitudinal side faces 40, at an angle to the upper and lower surfaces. Whereas variations in the angle may be permitted, we find the angle of 14° practical for our purposes. These longitudinal side faces 40 are rolled or otherwise formed into flats 42, adjacent and at right angles to the upper surface 36. These edge portions or flats may be, for example, of the order 1/16 to 3/32 of an inch in width. The ends of the body terminate in inclined lateral faces 44 which may advantageously be inclined at an angle on the order of 28° in relation to the upper and lower surfaces 36 and 38. The lateral end faces 44 may intersect the top surface at 46. It will be observed that the lower surface 38 is somewhat narrower than the upper surface 36.

Extending generally centrally along the lower surface 38 from end to end is a rib 48, shown as generally V-shaped or otherwise, the size and shape of which is unimportant for present purposes.

While we do not wish to be limited specifically to the bit form shown, we find it efficient for our purposes for use in the cutter heads of adzing machines employed, for example in adzing upper surfaces or seats in railroad ties to receive the tie plates or the base of the rail being laid on the ties.

In use, such cutter bits are subjected to wear, abrasion, shocks and severe impact. They may strike, for example ballast, bits of metal, old spikes, and the like, embedded in old ties. In order to meet this problem, and to provide an adzing cutter bit which has both high impact resistance and high resistance to wear, we employ the above described cutter body, and treat it as below set out.

A number of the preformed bodies are arranged along the support 12. We find it very advantageous to weld a relatively thin layer of abrasion resisting deposit to each end of each bit used. For example, we may use tungsten carbide, boron carbide or any other suitable hard wear-resistant material of the nature of abrasion resisting carbide particles in a ferritic matrix. This thin layer, indicated at 50 in Figure 6, may be applied by any suitable welding torch or the like, as set forth hereinafter. The support 12 may be bolted or otherwise secured on the base 10 and may have a flat, relatively smooth upper surface 52 which is generally flush and coparallel with the upper surface 54 of the insert and spacers 26 and 28. These upper surfaces may be flat and generally smooth so that a virtually uninterrupted surface is provided for supporting the bits.

The bits are disposed in generally parallel aligned rows A and B and a clamping bar, one for each row of bits, at 56 and 58, is provided and pulls down on the bits by any suitable clamping mechanism. For example, we indicate bolts 60 at one end on a pivot 62 in the end of the support and adapted to pass through an open-sided slot 64 in each end of the clamping bars. A suitable nut 66 and washer 68 or the like may be used on each bolt to pull the clamping bar firmly down on the flat upper surface of the bits. As shown in Figure 1, but omitted from the other figures for clarity, we may use C-clamps 70 or any suitable clamping means to apply clamping pressure to the bits at intermediate locations. Such means will additionally prevent run through and will maintain uniform heat to the ends of the bits.

The rows of bits A and B are brought together with their inclined lateral faces 44 firmly against the opposite inclined faces of the locating fin or ridge and the end edges 46 of the bits are brought together and held firmly to prevent run through.

Briefly, two rows of bits are brought together against the rib or fin, and a weld strip is run down on top of their abutting edge areas. When the weld material solidifies, the two rows are separated by breaking along the contact line. Previously, the two rows of bits with the bits in each row in contact were reversed, but it was difficult to make full contact along the opposite ends because the bits varied slightly in length. It is better to break the bits apart or separate them individually in each row and grind the two sides of the welds, and possibly the end. Then the bits may be reversed and any two bits may be matched up. The ends can then be brought together and slight variations in the length of the bits is not a problem.

The weld deposit may be laid in the form of a thin band or layer, from end to end of the support, over the abutting edges of adjacent rows of bit bodies. We may employ, for example, a weld tube of steel, surrounding fine particles of either tungsten or boron carbides. The result in such case is a weld layer which may be of a thickness, for example, of 1/32 to 1/16 of an inch on a bit thickness of 1/4 of an inch. This weld layer may be formed of tungsten carbide particles, as an example, embedded in a matrix steel. We may, for example, apply this layer in a band an inch or more in width. If we assume a width of the total band of 1 1/4 inches, there will be a layer deposited across the end of the surface 36 of each body to a width of the order of 5/8 of an inch. This layer is limited to the surfaces 36 and does not penetrate to any substantial degree between adjacent bit bodies in each row, since the bit bodies are surrounded by abutting short plane surfaces or flats 42 and the end edges 46 are in firm sealing contact due to bringing the rows together firmly which pevents weld material from running through. Thus, the result of the welding operation is the depositing of this layer of tungsten carbide or other abrasion resisting material on the steel, which is localized at the end portions of the broad surface 36 of each body. After each transverse passage of the welding heads or tool, the entire group of bits may be broken apart, first by breaking apart the rows, and then the individual bits within the rows.

We do not wish to be limited to any particular mechanism for carrying out the welding process, but a traveling welding head, such as shown and explained hereinafter, may advantageously be used.

In Figure 7 we have shown a strip 72 which may have upstanding rib 74 which may extend between the inclined sides of adjacent bits, as shown in Figure 4. However, the rib 74 is not necessary, and we may use merely a flat strip. They may be of copper or the like and may be easily pushed along the support when the bits are being initially positioned. The flat portion or base of the strip may be narrower than the distance between adjacent ribs on the bits.

The length of the strip may be materially less than the length of the bits. The end surfaces at 76 may be vertical, and the inner end does not have to conform to the rib 20 as do the ends of the bits.

It may be advisable to insert, at best, a suitable asbestos strip under the clamping bars both to insulate the clamping mechanism and to help it clamp uniformly. This will additionally prevent much needed heat from draining out of the bits during a weld run.

By welding a plurality of bits in a row, as above, less weld material is required. For example, if the weld material is applied to a single bit, the material would flow over and form a round edge. A sharp edge is needed so more weld material would have to be applied and then ground back to get a sharp cutting edge. We might add that bits made by our method have three to seven times the life of normal bits, or more, at only a small increase in cost. Additionally, our bits substantially reduce maintenance time required to replace worn out bits which involves disassembling parts of the machine and so forth, far fewer sharpenings, and cutter head changes.

As shown in Figures 1 and 8, we illustrate a typical welding setup. In Figure 1 a traveling welding head is indicated generally at 78 and is shown in three major portions or parts. For example, first is a preheat head 80 which is somewhat elongated and has a plurality of nozzles 82 shown with six nozzles to a row, although it might be otherwise. Next is a sweating head 84 which may have one lateral row of nozzles 86 with three or four such nozzles.

It will be noted that the nozzles in the preheat and sweating head are disposed generally upright or perpendicular to the upper face of the bits, as shown in Figure 8. Attached to or suitably supported on the sweating head, or adjacent to it, we position a guide or bracket 88 which may have a plurality of suitable openings or holes 90 to accept the weld rod or rods.

A cutoff head 92 brings up the rear and has a plurality of nozzles, for example three or four, as at 94, which are disposed at a suitable angle so that the flame emitted therefrom will contact the ends of the weld rods approximately at the precise point that the weld rods contact the upper surface of the bits.

The preheat head 80 merely brings the base metal of the bits up to temperature, while the sweating head heats the base metal up to the desired fusion temperature. The cutoff head 92, while it also heats the base metal, is primarily intended to melt or cut material off of the ends of the weld rods and the majority of the heat in the base metal has already been acquired from the preheat and sweating heads.

It will be realized that whereas we have described and shown a practical method and apparatus for making adzing bits, properly coated at the point of wear with a hard surface, nevertheless, many changes may be made in size and shape of the bit, and in the mechanism and steps used for making or treating it. We wish our description and drawings to be taken, therefore, as in a broad sense illustrative or diagrammatic rather than as limiting us to our precise showing herein.

The use, operation and function of our invention are as follows:

Adzing bits are subjected, as above mentioned, to severe wear and impact. We provide a bit which is admirably adapted both to resist wear and impact. Our preformed bit bodies may, for example, be of A.I.S.I. 6150, a steel well suited to austempering, in this section, for hardness as well as high impact resistance. Also, a metal which has optimum abrasion and wear-resisting qualities usually does not have the high impact properties required for this type of service. We provide a bit body which has both high hardness and toughness. Our preformed bit bodies are prevailingly used in an adzing machine with the surface 36 moving against the work. It is to this broad surface 36, therefore, that we apply the wear-resisting layers 50. These layers are applied, as above described, at each end of each bit body. We find it important, in practice, to have the abrasion-resisting layers of uniform thickness overlay the edges and corners which have sides perpendicular to the plane of the surface 36 upon which the weld is applied. We, therefore, preform the adzing bits with narrow flattened longitudinal edge portions or flats shown at 42. Since the bit bodies abut on the side flats during welding, weld material does not run through. The wear-resisting deposit is of uniform thickness and breaks with a relatively straight line along the edge.

We find in practice that the hard abrasion-resisting deposit supported by the super-tough cutter bit body prevents visible flaking or chipping of the tungsten carbide edges in operation. The weld deposits 50, in effect, are abrasion-resisting surfaces or faces which are bonded to the cutter bit bodies having superior impact properties at high hardness. In use, when the cutter bit is moved, in an adzing machine, about a generally vertical axis, the faces or layers 50 engage the work and provide the abrasion-resisting cutting edge. Because the abrasion-resisting deposit is bonded to and supported by a steel body or backing element, with high impact resistance, the body will absorb the impact and the bit will not be broken when it strikes against foreign material, metal, stone, or the like, in the course of the adzing operation. Thus, our adzing bits, though economical to manufacture, have a life upwards of three to seven times as long as any adzing machine bits heretofore known. This results in less down time between sharpenings, a substantial increase in production, and lower operational cost.

The adzing bit material may be approximately .50 carbon alloy steel for austempering. We may employ a chrome vanadium grade identified as A.I.S.I. 6150, which responds well to the austempering treatment. This gives us high hardness in the base material which supports the tungsten carbide and its matrix. The tungsten carbide and matrix deposit withstands the abrasion due to the beating of the ballast, spikes, ties, and various parts of the rail fastenings that may be left in the path of the adzer head.

It is desirable that the matrix which holds the tungsten carbide particles be as wear-resistant as possible but at the same time not brittle. This may be accomplished by adjusting the welding flame, proper treatment of the weld rod, and the use of proper temperature from the flame and the application of the flame for a proper amount of time.

Since we are concerned with parts that are relatively small as compared with the size of parts that are normally hard surfaced, the heat input and the control of carbon becomes very important. For example, a typical adzing bit may have a cross section of $\frac{1}{4}$ of an inch times $\frac{7}{8}$ of an inch and the weld deposit may be $\frac{1}{16}$ of an inch. Thus the heat should be carefully applied and the carbon should be closely controlled.

The various heads shown in Figure 8 may all be mounted on a suitable traveling-carriage so that, as viewed in Figure 1, the combined head structure may move at a uniform rate of speed down the table or support to automatically apply a predetermined amount and predetermined thickness of the material on the ends of the bits. It should be noted in Figure 8 that the preheat head 80 is somewhat elongated. The length, spacing and direction of the nozzles and heads become very important in such a setup. The preheat head 80 should be long enough and have a sufficient number of nozzles giving a predetermined heat such that, in accordance with the rate of travel, the bits will be brought up to a predetermined preheat temperature after the preheat head has passed. In other words, the heating effect from the preheat head is intended to be spread out and travel in advance of the real bonding and fusing step.

On the other hand, the sweating head 84 applies a localized heat to one bit at a time, while the preheat head overlaps more than one such bit, for example three, so that they are gradually and uniformly brought up. But the sweating head brings only a localized area of each bit up to what we shall refer to as the sweating temperature, which is the temperature at which the metal, primarily the base metal, will be ready to fuse and integrally bond to the weld metal. This temperature may not be sufficient to actually melt the weld rod, but it will be ready for fusing.

On the other hand, the cutoff head 92 has an inclined nozzle which bears directly on the end of the rod and the temperature of the flame from this nozzle is sufficient to melt the matrix material, thereby releasing the tungsten carbide particles. The melted matrix carries the particles evenly across the localized end of the bit and the previously acquired sweating temperature causes an integral fusing and solidification of the matrix.

The above arrangement gives a controlled heat but avoids overheating of the bit bodies, prevents run through of the metal at the contacting edges and the tungsten carbide particles will be uniformly distributed through the solidified matrix.

While we prefer an oxy-acetylene flame, any suitable welding flame could be used and since the details thereof may be conventional, we will not go into detail. We have shown various connections in Figure 1 and these may be conventional.

In heat treating or austempering the finished bit which is done after welding, consideration should be taken of both the base metal and the weld deposit, and their reaction upon each other. At the present, we use a preheat of 1,000° F. to avoid thermal shock and thereafter heat to 1,575° F. This is followed by a quench in a salt or any suitable molten bath at 650° F., which should be above the martensite formation temperature and held for approximately 30 minutes or until all of the austinite has been transformed, primarily an isothermal transformation, to bainite. This gives a Rockwell "C" hardness in the base metal of about 45 to 48. We merely set forth the above figures as typical examples and substantial variations may be effected, if desired. However, the temperatures and times set forth above are quite effective for our purpose.

It will be understood, also, that it is within the field of our invention to apply tungsten carbide or other wear-resistant material to the surface of rolled stock by other means. However, we prefer to employ a welding process in which a steel tube may be filled with tungsten carbide grains.

It should be kept in mind that the use of a thin carbide weld deposit, which may be of the order of $\frac{1}{16}$ of an inch in depth, provides a self-sharpening effect during the adzing operation. The abrasion-resistance or wear-resisting properties of A.I.S.I. 6150 are much less than the carbide layer and, therefore, the A.I.S.I. 6150 wears away faster than the carbide layer and the cutting edge remains adequately sharp.

We claim:

1. A method of forming adzer bits which includes arranging a plurality of the bits adjacent each other side by side in rows and end to end in at least two rows, depositing a thin layer of wear-resistant material across the junction of the ends of a plurality of the bits at a time that the bits are positioned end to end, allowing the layer of material to cool and solidify, and thereafter separating the bits by breaking the layer of material along the abutting edges of the bodies.

2. A method of forming adzer bits which includes positioning a plurality of bits adjacent each other, end to end and side by side, in firm contact, welding a thin layer of wear-resistant material across the junction of the ends of a plurality of the bits while they are so positioned, thereby coating said bits with a localized layer of weld material along and adjacent their ends, and thereafter separating the bits by breaking the layer along the abutting end edges of the bits.

3. A method of forming adzer bits, which includes arranging a plurality of preformed bit bodies in rows, side by side and end to end, positioning two such rows at a welding zone, depositing a thin layer of a wear-resistant material across the abutting ends of a pair of the rows, when such abutting ends are positioned in the zone, separating the rows from each other, and separating the bits in each row from each other.

4. The method of claim 3 characterized by and including the step of austempering the bit after the thin layer of wear-resistant material has been applied.

5. The method of claim 4 in which the bits are austempered after they have been separated from each other.

6. A method of making adzer bits from a collection of preformed elongated generally rectangular bit bodies, including the steps of providing flats on at least the longitudinal edges of each bit body, positioning a group of the rectangular bit bodies in at least two abutting rows, the flats on the longitudinal edges of adjacent bit bodies in the same row being in firm contact, and the edges of the bit bodies in adjacent rows being in firm contact and generally aligned, and applying a thin layer of a wear-resistant material of a predetermined thickness and width along one side of the aligned contacting end edges of adjacent rows.

7. The method of claim 6 further characterized in that the layer of wear-resistant material is applied by welding, and including the step of controlling the temperature developed in the ends of the bit bodies by preheating the bits prior to applying the weld material.

8. The method of claim 7 characterized by and including the steps of thereafter separating the adjacent rows of bit bodies along the aligned contacting end edges, and grinding the edge of the wear-resistant material along at least the end edges.

9. The method of claim 8 characterized by thereafter positioning the bit bodies in reverse relation so that the end edges at the non-coated end are in firm contact and generally aligned, and applying a thin layer of the wear-resistant material of a predetermined thickness and width along the aligned contacting end edges.

10. A method of making an adzer bit from a preformed generally rectangular bit body, including the steps of positioning such a bit body generally horizontally with a generally flat surface up, preheating a localized area of such surface at least at one end for a predetermined period of time, immediately thereafter additionally heating such area to bring it to a predetermined sweating temperature, supplying a rod of a wear-resistant material which will fuse to the bit body at the sweating temperature, applying the end of the rod to such area of the bit body, and melting material from the end of the rod with a separate heat source at a higher temperature than the sweating temperature to deposit material from the end of the rod on the localized area of the bit.

No references cited.